Figure 1:
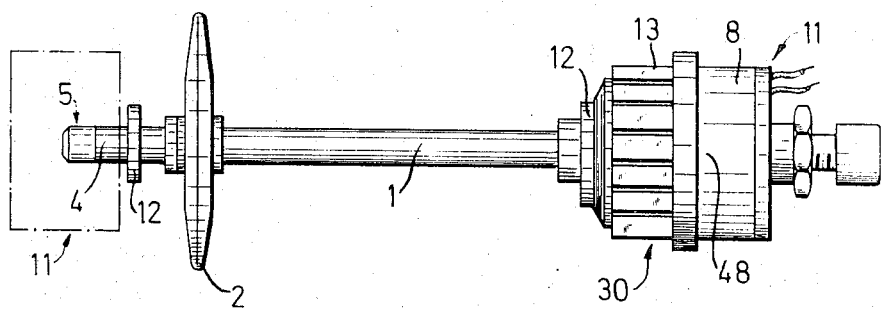

United States Patent [19]
Doll et al.

[11] 3,778,122

[45] Dec. 11, 1973

[54] SYSTEM FOR CONTACT-FREE, AXIALLY STABILIZED AND RADIALLY CENTERED POSITIONING OF A ROTATING SHAFT, PARTICULARLY OF AN OPERATING MACHINE FOR LOW TEMPERATURES

[76] Inventors: Robert Doll, Mettinghstr. 1, 8 Munich 19; Hartmut Berndt, Konigsteinstr. 11, 8 Munich 13, both of Germany

[22] Filed: July 19, 1972

[21] Appl. No.: 273,318

[30] Foreign Application Priority Data
July 29, 1971 Germany.................. P 21 37 850.7

[52] U.S. Cl. ................................................ 308/10

[51] Int. Cl. ............................................ F16c 39/06
[58] Field of Search ....................................... 308/10

[56] References Cited
UNITED STATES PATENTS
3,110,481  11/1963  Kivenson .......................... 308/10 X
3,243,238  3/1966  Lyman ................................. 308/10

Primary Examiner—James D. Trammell
Attorney—Silverman & Cass

[57] ABSTRACT

A system for contact-free, axially stabilized and radially centered positioning of a rotating shaft, particularly of an operating machine for low temperatures.

12 Claims, 3 Drawing Figures

SYSTEM FOR CONTACT-FREE, AXIALLY STABILIZED AND RADIALLY CENTERED POSITIONING OF A ROTATING SHAFT, PARTICULARLY OF AN OPERATING MACHINE FOR LOW TEMPERATURES

The invention relates to a system for contact-free, axially stabilized and radially centered positioning of a rotating shaft, particularly of an operating machine for low temperatures, comprising radially centered bearings associated with each shaft end and operated by magnetic forces, and an electro-magnetic servo mechanism for axial stabilization, whose electro-magnetic device acting axially on the shaft is controlled by a tracer system for the position of the shaft.

Such a positioning system is described in the ETZ.-B. volume 13 (1961, page 525). The bearings associated with the shaft ends are formed by ferrite rings. The axial stability is assured by an electro-magnetic servo mechanism. There is a disadvangage in this respect that the reset forces occurring in case of a deflection of the shaft are small, so that a precise positioning of the shaft is impossible. Moreover, a positioning system of an electric motor for high numbers of revolutions with a vertical rotor shaft is known from the German Auslegeschrift 1,219,117, where one shaft end is positioned in a thrust bearing on a hydraulic or pneumatic cushion, while a magnetic centering apparatus in the form of opposite concentric combs is associated with the other shaft end. This type of positioning system is not a purely magnetic one. Due to the use of a thrust bearing with a hydraulic or pneumatic bolster such a positioning system cannot be applied at low temperatures.

The invention has the object of creating a magnetic positioning system for a rotating shaft which permits a precise and exact positioning of the shaft.

Starting out from the initially mentioned magnetic positioning system of the prior art, the problem is solved by the invention in that each radially centered bearing is provided with at least one annular cutting edge or blade concentrical to the axis of the shaft, connected to the shaft, made of ferro-magnetic material, and with a stationary annular blade of ferro-magnetic material, placed opposite at a small gap, and that both annular blades are located in the magnetic circuit of a stationary magnet.

The magnetic cutting edge bearings associated with each shaft end produce at a deflection of the shaft relatively high resetting forces. A rotating shaft can be positioned precisely and exactly as to position according to the invention in connection with an electro-magnetic servo mechanism for axial stabilization.

A rotating shaft, particularly an operating machine may be exposed to kindling forces which lead to disturbing movements. Such a disturbing movement is the precession movement of the shaft. In order to obtain a precise position in each case, a tracer-controlled electro-magnetic system exerts a radial force on the shaft to avoid precession movements, the tracer system also responds to radial deflections of the shaft and the exerted radial power effect of the electro-magnetic system is coordinated as to position with the determined radial deflection. That way it is possible even at the risk of the occurrence of precession movements to obtain an exact and precise positioning of a rotating shaft. Practical experments have demonstrated that that way very high numbers of revolutions are attainable which otherwise are unattainable because of the occurring disturbing movements.

Another interfering movement is the rolling movement of the shaft wherein the rotating shaft carries out a circular movement parallel with the longitudinal axis of the bearing. To avoid such rolling movements of the shaft, the non-rotating parts of the positioning system are held firmly, according to another embodiment of the invention, with given attenuation, and the inherent frequency of the elastic holding means is tuned to the inherent frequency of the rolling movement. Particularly the combination of the magnetic annular blade bearings with the means to avoid movements of precession and rolling of the shaft allows precise positioning of the shaft even if these kindling or starting forces should be exposed to the generation of such interfering movements, even at maximum revolutions of the shaft.

According to another embodiment of the invention the stationary annular blade is designed as a polar leg of the magnet. The annular blade connected to the shaft end forms an air gap with another polar leg of the magnet.

According to another embodiment of the invention, the gap between opposite annular blades is smaller than the gap between the mobile annular blade and the associated polar leg of the magnet.

Preferably the magnet is an axially magnetized permanent magnet surrounding the shaft end concentrically.

According to another embodiment of the invention the electro-magnetic system comprises a flange fixed to the shaft, perpendicular to the axis of the shaft and a coil surrounding the shaft ring-like, with an annular iron core U-shaped in cross-section, and the surface of the pole shoe ends facing the shaft flange extending obliquely to the axis of the shaft. Such an electro-magnetic system generates besides the axially stabilizing forces also the forces necessary to avoid the interfering movement. Thus, separate magnetic systems can be avoided.

According to another embodiment of the invention, the tracer system for maintaining the radial deflection and axial displacement of the shaft is a photo-electric tracer apparatus whose light beam cluster traverses the annular gap between opposite annular blades. Such a tracer system is direction-oriented so that both the axial movements of displacement of the shaft and also the position changes occurring during interfering movements are taken into consideration. Again separate tracer apparatuses for the individual types of movement are avoided thereby.

The photo-electric cell of the tracing apparatus is preferably connected to a PD control system to which the winding of the electro-magnet to be controlled is connected.

Figure 3:
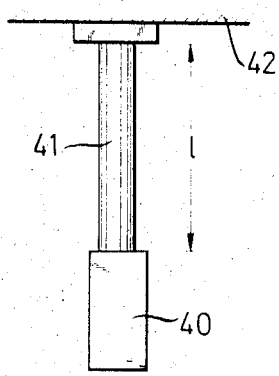
Figure 2:
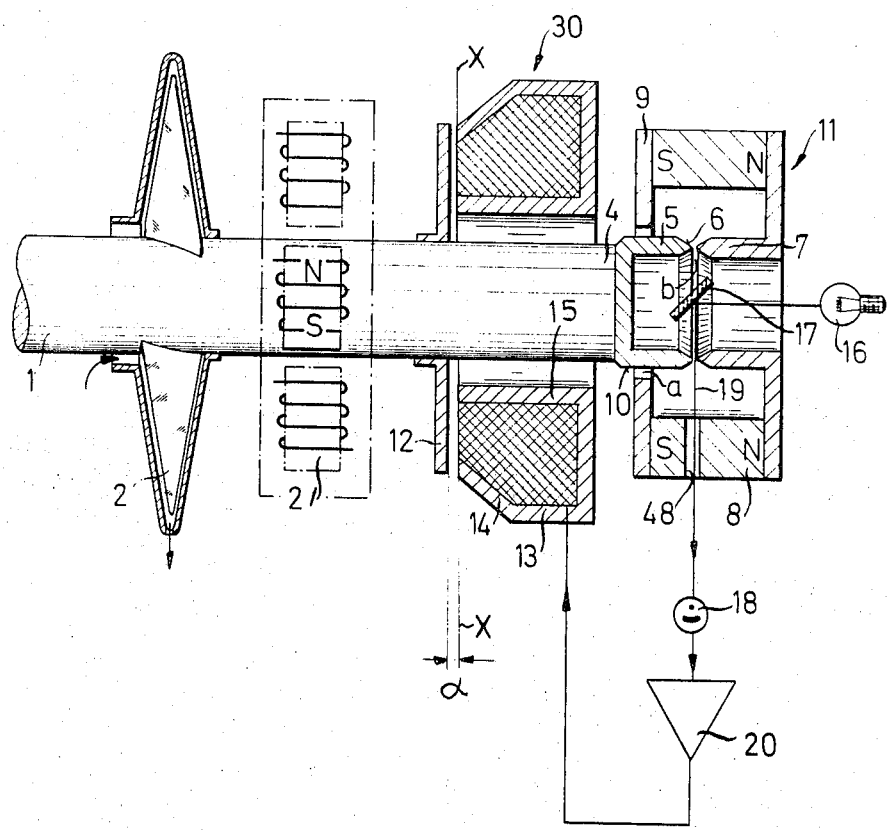

Below, the invention is described in detail by means of an embodiment represented in the drawing, in which FIG. 1 shows a lateral view of a rotating shaft with associated bearings;

FIG. 2 shows a schematic view of the magnetic positioning system of the shaft, and FIG. 3 shows a schematic view of the holding means of an operating machine with the shaft positioning system according to the invention.

The rotating shaft 1 is driven for example by a schematically indicated turbine wheel 2 or a motor 2'. At each of its ends 4 the shaft 1 is provided with an annular blade 5 of ferro-magnetic material formed by tapered surfaces 6, extending preferably below 45°.

Placed opposite, a blade-like annular pole shoe 7 is associated stationarily to each annular blade 5. An annular permanent magnet 8 likewise made of ferro-magnetic material is fixedly connected to the annular pole shoe 7 and magnetized in the longitudinal direction of the shaft.

An additional annular pole shoe 9, likewise made of ferro-magnetic material is also fixedly connected to the annular permanent magnet 8, the free end of said shoe is arranged opposite the annular surface 10 of the annular blade 5.

The annular gap $a$ is to be maintained substantially larger than the annular gap $b$.

The magnetic system 11 can be considered as a radially acting magnetic system.

An annular flange 12 of ferro-magnetic material is fastened to or formed at shaft 1. An electro-magnet 13 with a laminated iron core which annularly surrounds the shaft 1 is associated with one side of flange 12. Its pole shoes 14 and 15 are of annular shape and the pole shoe surface $x - x$ forms an angle of less than 90° with the longitudinal axis of shaft 1.

The electro magnet 13 and the flange 12 form the axially stabilizing magentic system 30 which makes it possible in addition to prevent a disturbing or interfering movement of precession.

The scanning apparatus for determining the axial errors and the errors additionally caused by the prescession movement comprises a luminous source 16, a reversing mirror 17 and a photo-electric cell 18. The reversing or deflecting mirror 17 is so arranged in the magnetic system 11 that the deflected light beam 19 passes through the annular gap $b$ to be controlled, outwardly via a perforation 48 in the annular magnet 8. The intensity of the exiting light beam is changed by axial faulty movements of shaft 1 and converted into signal changes by the photo-electric cell 18. These signals are transmitted to a PD control system 20 of known design whose output feeds the coil of the electro-magnet 13.

In operating or production machines with a magnetic positioning system a rolling movement can occur as additional interfering movement. The rolling movement is a circular movement of the rotor shaft parallel to itself in the rotation-symmetrical field of force. The circumferential speed is, here, determined by the mass of the rotor and the radial resetting forces. In order to control such interference movement it is possible to so design the stationary holding means and so determine its elasticity and attenuation that the inherent frequency of the holding means comes to be located in the proximity of the rolling frequency.

The inherent frequency of the holding means also can be tuned to the rolling frequency by applying additional masses. Here, the mass may be applied directly to the fomration to be tuned, for example, the housing, or via an elastic member, so that the mass determines the inherent frequency of the entire system via the elastic member.

As shown schematically in FIG. 3, an operating machine 40 with a magnetic positioning system, particularly for low temperatures, is connected via a pipe 41 of a length 1 to space-bound formations 42; to avoid any rolling movement, the length 1 of the tube 41 and thus the inherent frequency of the holding means can be tuned to the rolling frequency. It is also conceivable to effect the tuning of the inherent frequency of the holding means in relation to the rolling frequency in some other manner, as mentioned above.

We claim:

1. A contact-free, axially stabilized and radially centered positioning system of a rotating shaft, particularly of an operating machine for low temperatures, comprising radially centered bearings associated with each shaft end operated by magnetic forces, and an electro-magnetic servo-mechanism for axial stabilization whose electro-magnetic system acting axially on the shaft is controlled by a tracer system for the position of the shaft characterized by the fact that each radially centered bearing is provided with at least one annular cutting blade (5) concentric to the shaft (1) made of ferro-magnetic material, and with a stationary annular blade (7) of ferro-magnetic material placed opposite at a small gap, and that both annular blades are located in the magnetic circuit of a stationary magnet (8).

2. A positioning system, especially according to claim 1, characterized by the fact that to avoid movements of precession of the shaft a tracer-controlled electro-magnetic system (30) exerts a radial force on the shaft (1), that the tracer system (16,17,18) responds also to radial deflections of the shaft and that the exerted radial effect of force of the electro-magnetic system, is coordinated in position to the determined radial deflection.

3. A positioning system particularly according to claim 1, characterized in that in order to avoid rolling movements of the shaft at a given attenuation the non-rotating parts of the positioning system are held firmly elastically and the inherent frequency of the elastic holding means is tuned to the inherent frequency of the rolling movement.

4. A positioning system according to claim 1, characterized by the fact that the stationary annular cutting edge (7) is designed as a polar leg of the magnet (8).

5. A positioning system according to claim 1, characterized by the fact that the annular blade (5) connected to the shaft end (4) forms an air gap with another polar leg (9) of the magnet.

6. A positioning system according to claim 5, characterized by the fact that the gap ($b$) between the opposite annular blades (5,7) is smaller than gap ($a$) between the mobile annular blade (5) and the associated polar leg (9) of the magnet.

7. A positioning system according to claim 5, characterized in that the magnet (8) is an axially magnetized permanent magnet concentrically surrounding a shaft end (4).

8. A positioning system according to claim 2, characterized in that the electro-magnetic system (30) embraces a flange (12) fixed to the shaft (1) perpendicular to the axis of the shaft, and a coil annularly surrounding the shaft, with an annular iron core of U-shaped cross-section, and the plane ($x - x$) of the pole shoe ends (14,15) facing the shaft flange extends obliquely to the axis of the shaft.

9. A positioning system according to claim 8, characterized in that the tracer system (16,17,18) for holding the radial deflection and axial displacement of shaft (1) is a photo-electric tracer system whose cluster of light beams traverses the annular gap ($b$) between opposite annular blades.

10. A positioning system according to claim 9, characterized in that the photo-electric cell (18) of the tracer system is connected to a PD control system (20), to which the coil of the electro-magnet (13) to be controlled is connected.

11. A positioning system according to claim 4, characterized by the fact that the annular blade (5) connected to the shaft end (4) forms an air gap with another polar leg (9) of the magnet.

12. A positioning system according to claim 6, characterized in that the magnet (8) is an axially magnetized permanent magnet concentrically surrounding a shaft end (4).

* * * * *